United States Patent Office 2,834,770
Patented May 13, 1958

2,834,770
WATER-SOLUBLE SHELLAC POWDER

Walter Kalkhof-Rose, Mainz, Germany

No Drawing. Application July 22, 1957
Serial No. 673,108

1 Claim. (Cl. 260—97)

This is a continuation-in-part of my copending application Serial No. 598,248, filed on July 17, 1956, now abandoned.

The invention relates to the manufacture of chlorine-bleached shellac powder of acid characteristics which is dispersible in water and whose watery dispersion dries irreversibly, and to a method of manufacturing same.

It is already known to spray dry certain neutral and alkaline solutions of natural rosins resulting in dry powders which are repeatedly water-soluble. It is also known that shellac occupies a certain special position among other resins mainly because it is insoluble in water without addition of an alkali. Shellac is the only natural rosin which, when an acidic watery dispersion thereof is dried, produces a non-soluble shellac coating, and on this property is based its use in several industries. Shellac also has the tendency to darken, to agglomerate and to disintegrate when exposed to heat. That the dried acidic dispersions of shellac cannot be redissolved in water and that this property is more pronounced in shellac than in other resins was the expert opinion as late as in 1950 (see, for example, "Taschenbuch für die Farben- und Lackindustrie," by Erich Stock, Wissenschaftliche Verlagsgesellschaft m. b. H., Stuttgart, 1950, pages 468, 469). It is desirable that the pH of a shellac solution for use in various industries remain below 7 as a neutral or alkaline shellac solution has very little practical value because it may be repeatedly dissolved in water. On the other hand, it has been generally accepted that an acid shellac-borax solution will dry irreversibly and can be redissolved only in the presence of additional amounts of alkali. This strange and rather unique behavior of shellac led the experts to believe that the application of spray drying for acid shellac dispersions is not only impractical but outright undesirable since, according to expectations, a spray dried shellac powder prepared from acidic shellac dispersions would be useless for any and all practical purposes. No spray dried shellac powder has been known or used in the shellac industry.

Heretofore, the bringing of dry shellac into solution for varied purposes presented many difficulties. Even when dissolved in the presence of a mild alkali, for example borax, shellac presents changed characteristics evidenced by strong darkening of the solution. Chlorine bleached shellac has the added tendency to cake and to disintegrate rapidly if not stored at temperatures below freezing. In tropical regions, the useful life of bleached shellac is less than ten weeks. It is also known that caking of shellac accelerates further polymerization and renders the bleached shellac insoluble.

To obviate all such objections to the shellacs manufactured in accordance with prior processes, the invention provides a method for the production of a novel variety of shellac with distinctly novel characteristics. Among these are: (1) absolute lack of caking; (2) low acid number; (3) uniform particle size of the powder; (4) practically unbounded stability of chlorine bleached shellac powder; (5) dispersibility of bleached shellac powder in water without addition of an alkali; (6) clarity and colorlessness of such solutions; and (7) a melting point which is more than 30° C. higher than that of the known shellac products. I have discovered that, contrary to all expectations based on the prior konwledge of shellac, chlorine-bleached shellac dispersions of acid characteristics may be subjected to the spray drying process with surprisingly satisfactory results, thus representing a substantial and fully unexpected advance in the art. The spray-dried, chlorine-bleached shellac is easily dispersible in water, but will dry irreversibly when used as a coating, for example, as a lacquer, or in any other known manner. The heat stability of such chlorine-bleached shellac powder produced by spray drying is substantially higher than that of any shellac powder produced in accordance with heretofore known methods. Thus, the important novel step of my process is in that a chlorine-bleached shellac dispersion of acid characteristics is subjected to spray drying which, as before stated, is contrary to expectations of experts familiar with the art of shellac, and results in a product of superior characteristics.

The novel method of this invention consists basically in (a) subjecting chlorine-bleached shellac, after its sodium chloride has been removed and while still in its moist or wet state, to the action of a minimum quantity of a fixed alkali, preferably borax, to partially neutralize and dissolve the shellac, and (b) immediately subjecting such still acidic watery dispersion to fine particle distribution in a spray drier. The spray drying of the shellac dispersion should be carried out at slightly raised temperatures not exceeding 70° C. It is quite surprising that the intimate intermixture of the shellac-alkali dispersion with the gaseous drying medium brings about a flour-like, non-adhesive substance which may be readily filled into containers for packing, and which possesses all the above mentioned advantages over the prior shellacs. Even though the spray dried shellac powder may be dispersed in water, it produces a non-soluble film if such a dispersion is again subjected to drying. This distinguishes the novel product from all known spray-dried neutral and alkaline rosin solutions which will dry reversibly, i. e., they may be repeatedly dissolved in water.

Moreover, the novel variety of shellac manufactured in accordance with the method of this invention has a low liter weight of about 200 g. with a specific volume as low as about 0.2 compared to 0.6 of the hitherto known shellacs. The liter weight and the specific volume depend on the chosen concentration of the shellac dispersion, the applied drying temperature and the quality of the drying medium.

The spray dried flour-like shellac powder is non-adhesive and free of agglomeration. Its refined shellac content is very high, indeed unexpectedly high, about 90%, and its stability is practically unlimited. The moisture content of the powder is about 2–4½% while its acid number is between 60 and 65. In contrast to the irregular shapes heretofore obtained, the shape of the spray dried shellac powder is regular, its size is about 200 mesh, and its solution in water without addition of an alkali has a pH not exceeding 6.7. The melting point of the spray dried shellac is unexpectedly high, usually between 80 and 170° C.

A comparison of known, normal, fresh, commercially available shellac powders with my spray dried shellac powder has yielded the following results:

(1) The softening point and the melting point of known shellac powders determined in accordance with the "Durrans" method (3 g. of shellac powder placed into a test tube of 150 mm. length and 16 mm. diameter) are at 62° C. and between 70–72° C., respectively. The softening point of spray dried shellac powder is at 90° C., and its melting point at 120° C.

(2) By following the "Angelo Brothers" method (employing fine 1 mm. capillary tubes), the softening and melting point of known shellac powders have been found to be at 61° C. and between 69–70° C., respectively. The softening point of spray dried shellac powder is at 82° C., and its melting point at 105° C.

(3) By following the standard method according to Ubbelohde, the melting point of standard shellac powder is at 74° C., and the melting point of spray dried shellac powder at above 120° C. The dropping point could not be determined in either case.

(4) By employing electrically heated drying cabinets (5 g. shellac placed into open pans of 75 mm. diameter), the softening point of standard shellac powder has been determined to be at about 62° C., and its melting point at about 74° C. The softening point of spray dried shellac powder is at 95° C., and its melting point at 170° C.

This superior characteristic of the spray dried shellac powder, in addition to many other advantages, facilitates its shipping and storage, especially in tropical regions.

Immediately after precipitation, the bleached shellac has a pH of about 4–5. After repeated washing with fresh water, the pH value is between 5.5–6. Before spray drying, the shellac-borax solution has a pH of about 6.3–6.5. The percentage of borax or other fixed alkali, such as caustic soda, potassium hydroxide, sodium perborate, ammonia, sodium phosphate and triethanolamine, added to the moist bleached shellac may vary between 2 and 20%, preferably not more than 12%, depending on the percentage of shellac in the solution. Optimum results are obtained when the shellac-borax solution before spray drying contains about 7% borax and about 65% water. The shellac powder obtained by spray drying of such a solution has an acid number of 65 and its dispersion in water a pH of about 6.5–6.7.

The following examples are illustrative of some embodiments of my invention. Preferably, chlorine bleached shellac products are used as the basic substance.

*Example I*

After removal of sodium chloride remaining from the bleaching process of either wax-containing or wax-free chlorine bleached shellac, and while the shellac is still in its moist condition, 100 kilograms of the moist product are dissolved with a minimum amount of borax to a milky, colloidal or clear solution at normal or slightly raised temperatures, preferably between 20–25° C. The shellac content of the solution varies between 15–40%, depending on the conditions under which the spray drying is carried out, and also on the product finally desired for its subsequent utilization. As an example, a shellac solution with about 30% shellac content is immediately dried in a spraying tower at temperatures between 60–70° C. The so-called Krauss sprayer, under normal conditions and with a normal number of revolutions, has given excellent results. It is not necessary to cool the bottom of the tower as the spray dried shellac is heat resistant and free of agglomeration immediately after leaving the spray nozzle.

It is important that a fixed alkali, such as borax, be used and that, contrary to all proposals heretofore made, its quantity be small in relation to the shellac content. The shellac-borax solution before spray drying contains between 40–80% water, between 2–12% borax, preferably 7%, and between 15–40% of bleached shellac. The pH of the solution before spray drying is between 4 and 6.5. As before stated, it is also important that the spray drying be carried out forthwith after the basic shellac product has been freed of its waste or residue adjunct from the bleaching process, while it is still wet or moist, and after it has been dissolved in the presence of minimum amounts of a fixed alkali. It is equally important that the spraying be a dry air spraying, in contrast to air blowing wherein the air is introduced under pressure into a liquid and oxidation would result, as the spray drying insures an intimate contact of the drying air with the minute shellac particles.

A flour-like, non-adhesive product of substantially uniform fine mesh is obtained which may be readily removed from the bottom of the spraying tower and filled in containers for shipment. This product can be stored for an unlimited time and will stand the temperatures of tropical climates without deterioration. Shellac powder manufactured in accordance with the method of this invention in the year 1949 still maintains its advantageous characteristics and is readily soluble in water without darkening.

The spray dried shellac powder may be dispersed in water to obtain the desired sizing as follows:

Sixty parts by weight of the improved shellac powder are added to 350 parts by weight of warm water with a temperature of about 55° C. The mixture is stirred and slightly heated to maintain its temperature at 55° C. After about three minutes, forty parts by weight of the improved shellac powder are added to the aqueous dispersion, preferably while stirring, and maintained at the same temperature for a further 5–10 minutes. A completely clear dispersion of 6.5 Bé. and with a pH of about 6–6.5 is obtained. By further addition of water, any desired concentration or viscosity can be had. It will be noted that water alone, without addition of an alkali, acts as a dispersing medium for the improved shellac powder. It is most surprising that the drying of such aqueous shellac dispersion occurs irreversibly. This characteristic, together with the dispersibility of spray dried shellac powder in water, has prompted its acceptance in many branches of modern industry, among which may be mentioned the manufacture of fancy coated and glazed papers, leather dressings, aniline printing inks (water and solvent basis), men's hats, self-polishing floor wax emulsions (no-rub type), mascara, liquid shoe polishes, fruit and vegetable coatings, hair lacquers, latex dispersions, photographic cold top enamels, and many others.

If the shellac-borax solution of Example I is dried in any other manner, the product cannot be redissolved in water alone.

*Example II*

A shellac produced by the solvent extraction method is dissolved in an aqueous solution of borax after the shellac has passed through the ordinary pre-evaporator in a concentration of at least 80%, whereby a milky, colloidal or clear solution is obtained. Whether the shellac is wax free or contains wax is immaterial. The solution with a shellac content of about 30% is then spray dried under the conditions given in Example I. There is obtained a powder of very fine flour-like consistency which is readily dispersible in water or alcohol without addition of an alkali.

Thus, here again, water alone is sufficient to act as the dispersing medium. However, for complying with the desideratum of a special sizing, two parts of borax are dissolved in 350 parts of water at 55° C., whereupon about sixty parts by weight of spray dried shellac powder are added. After a short time period, another forty parts by weight of the novel shellac powder are added to obtain a dispersion which is entirely transparent, clear, with about 6.6 Bé. and a pH of 6.7. To further improve the transparency of the dispersion, a few ccm. of ammonia may be added. Addition of water, cold or lukewarm, enables any desired viscosity to be had.

Depending on the intended use of the final product in different industries, the improved method may be modified by the addition of borax, caustic soda, sodium phosphate, triethanolamine, etc.

*Example III*

280 kilograms of freshly precipitated, still moist bleached shellac from the manufacture with a shellac content of 30% were carefully mixed with 18% of borax and the mixture was heated by introduction of steam to about 30° C. with agitation. The shellac dissolved in the aqueous borax solution without difficulty. The solution was then transformed into shellac powder by spray drying. One kilogram of such shellac powder was mixed with 3.5 kilograms of water until a lump-free mixture was obtained. The mixture was slowly heated in a water bath to 50–60° C. The shellac started to swell, then to dissolve and the dissolution was accelerated by stirring. Upon reaching the temperature of 60° C., the shellac was completely dissolved. The solution had a pH value of 6.5. Dissolution took about 15 minutes.

When a thin film of the shellac-borax dispersion prepared for spray drying in accordance with Example III was dried at room temperatures for 24 hours, the dried product was insoluble in water after several days of boiling.

It will be noted from the above description that an entirely new method of manufacturing water dispersible shellac has been presented which consists in spray drying intermediate solutions of freshly bleached shellac with a minimum amount of fixed alkali. The novel flour-like product shows the characteristic features heretofore described, and the ultimate utilization product, to wit: the aqueous dispersion of spray dried shellac with a pH not exceeding 6.7, dries irreversibly as it connot be redissolved in water.

What I claim and desire to protect by Letters Patent is:

A shellac powder obtained by spray drying at elevated temperatures not exceeding 70° C. a shellac solution with a pH of between 5–6.7 and a moisture content of between 40–80% by weight, the solution being prepared by subjecting at room temperatures between 15–40% by weight of chlorine bleached shellac, free of bleaching residues and while still wet, to the action of between 2–12% by weight of a fixed alkali selected from the group consisting of borax, caustic soda, potassium hydroxide, sodium perborate, ammonia, sodium phosphate and triethanolamine, the spray-dried powder being dry, non-adhesive, of uniform fine mesh, non-blocking, stable at above refrigeration temperatures, having a liter weight of about 0.2, a gravity of about 6.5–6.6 Bé., an acid number of about 60–65 and being dispersible in water without addition of alkali, the aqueous dispersion of the powder having a pH not exceeding 6.7.

References Cited in the file of this patent

UNITED STATES PATENTS

| | | |
|---|---|---|
| 345,202 | Wolf | July 6, 1886 |
| 1,303,782 | Dugan | May 13, 1919 |
| 2,386,421 | Bassford | Oct. 9, 1945 |
| 2,534,703 | Fenelon et al. | Dec. 19, 1950 |

FOREIGN PATENTS

| | | |
|---|---|---|
| 14,456 | Great Britain | June 5, 1902 |

OTHER REFERENCES

Murty: Ind. and Eng. Chem., February 1939, vol. 31, No. 2, page 238.